(12) United States Patent
Hasegawa et al.

(10) Patent No.: US 11,390,932 B2
(45) Date of Patent: Jul. 19, 2022

(54) HIGH-STRENGTH HOT-DIP GALVANIZED STEEL SHEET AND METHOD FOR PRODUCING THE SAME

(71) Applicant: JFE Steel Corporation, Tokyo (JP)

(72) Inventors: Hiroshi Hasegawa, Tokyo (JP);
Tatsuya Nakagaito, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/417,858

(22) PCT Filed: Aug. 23, 2019

(86) PCT No.: PCT/JP2019/033080
§ 371 (c)(1),
(2) Date: Jun. 24, 2021

(87) PCT Pub. No.: WO2020/136988
PCT Pub. Date: Jul. 2, 2020

(65) Prior Publication Data
US 2022/0074013 A1    Mar. 10, 2022

(30) Foreign Application Priority Data
Dec. 26, 2018 (JP) .............................. JP2018-242710

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *C21D 6/001* (2013.01); *C21D 6/002* (2013.01);
(Continued)

(58) Field of Classification Search
CPC .......... C21D 9/46; C21D 6/001; C21D 6/002; C21D 6/005; C21D 6/008; C21D 8/0205;
(Continued)

(56) References Cited

U.S. PATENT DOCUMENTS 8,993,120 B2   3/2015   Kawata et al.
9,109,275 B2   8/2015   Morimoto et al.
(Continued)

FOREIGN PATENT DOCUMENTS

CN   105814227 A   7/2016
CN   108603269 A   9/2018
(Continued)

OTHER PUBLICATIONS

International Search Report and Written Opinion for International Application No. PCT/JP2019/033080, dated Nov. 26, 2019, 5 pages.
(Continued)

*Primary Examiner* — Humera N. Sheikh
*Assistant Examiner* — Katherine A Christy
(74) *Attorney, Agent, or Firm* — RatnerPrestia (57) ABSTRACT

A high-strength hot-dip galvanized steel sheet has a hot-dip galvanized layer on a surface of the steel sheet, a specific component composition, and a steel microstructure containing, on an area percentage basis, 0% to 15% of ferrite and upper bainite in total, 80% to 100% of lower bainite and martensite in total, and 0% to 10% of retained austenite, and containing precipitates having a particle size of 100 to 2,000 nm in an amount of $10^9$ to $10^{12}$ particles/m² in a region extending to a position 100 to 300 μm from the surface layer of the steel sheet, in which the ratio of the average amount of C at a position 5 μm from the surface layer of the steel sheet to the average amount of C at a position 70 μm from the surface layer of the steel sheet in the thickness direction is 0.20 to 0.80.

14 Claims, 1 Drawing Sheet

(51) Int. Cl.
*C21D 6/00* (2006.01)
*C21D 8/02* (2006.01)
*C22C 38/00* (2006.01)
*C22C 38/02* (2006.01)
*C22C 38/06* (2006.01)
*C22C 38/08* (2006.01)
*C22C 38/14* (2006.01)
*C22C 38/16* (2006.01)
*C22C 38/24* (2006.01)
*C22C 38/38* (2006.01)
*C23C 2/28* (2006.01)
*C23C 2/40* (2006.01)

(52) U.S. Cl.
CPC ............ *C21D 6/005* (2013.01); *C21D 6/008* (2013.01); *C21D 8/0205* (2013.01); *C21D 8/0226* (2013.01); *C21D 8/0236* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/14* (2013.01); *C22C 38/16* (2013.01); *C22C 38/24* (2013.01); *C22C 38/38* (2013.01); *C23C 2/28* (2013.01); *C23C 2/40* (2013.01); *C21D 2211/002* (2013.01); *C21D 2211/005* (2013.01); *C21D 2211/008* (2013.01)

(58) Field of Classification Search
CPC ............... C21D 8/0226; C21D 8/0236; C21D 2211/002; C21D 2211/005; C21D 2211/008; B32B 15/013; C23C 2/28; C23C 2/40
USPC ........................................................ 428/659
See application file for complete search history.

(56) References Cited

U.S. PATENT DOCUMENTS

| | | |
|---|---|---|
| 2013/0048151 A1 | 2/2013 | Kawamura et al. |
| 2016/0319385 A1* | 11/2016 | Hasegawa ............... C22C 38/38 |
| 2019/0153575 A1 | 5/2019 | Shibata et al. |
| 2020/0032364 A1 | 1/2020 | Hirashima et al. |
| 2020/0165708 A1 | 5/2020 | Hasegawa et al. |
| 2020/0299797 A1 | 9/2020 | Kohsaka et al. |

FOREIGN PATENT DOCUMENTS

| | | |
|---|---|---|
| EP | 2594656 A1 | 5/2013 |
| EP | 2762603 A1 | 8/2014 |
| EP | 3054025 A1 | 8/2016 |
| EP | 3219821 A1 | 9/2017 |
| KR | 101726090 B1 | 4/2017 |
| KR | 101726090 B1 | 4/2017 |
| WO | 2011025042 A1 | 3/2011 |
| WO | 2011105385 A1 | 9/2011 |
| WO | 2013047760 A1 | 4/2013 |
| WO | 2016129550 A1 | 8/2016 |
| WO | 2017169869 A1 | 10/2017 |
| WO | 2018055425 A1 | 3/2018 |
| WO | 2018146828 A1 | 8/2018 |
| WO | 2018186335 A1 | 10/2018 |

OTHER PUBLICATIONS

Extended European Search Report for European Application No. 19 902 584.2, dated Nov. 2, 2021, 13 pages.

Chinese Office Action for Chinese Application No. 201980086541.5, dated Apr. 27, 2022 with Concise Statement of Relevance of Office Action, 12 pages.

* cited by examiner

HIGH-STRENGTH HOT-DIP GALVANIZED STEEL SHEET AND METHOD FOR PRODUCING THE SAME

CROSS REFERENCE TO RELATED APPLICATIONS

This is the U.S. National Phase Application of PCT/JP2019/033080, filed Aug. 23, 2019, which claims priority to Japanese Patent Application No. 2018-242710, filed Dec. 26, 2018, the disclosures of these applications being incorporated herein by reference in their entireties for all purposes.

FIELD OF THE INVENTION

The present invention relates to a high-strength galvanized steel sheet suitable for automotive components and a method for producing the high-strength galvanized steel sheet.

BACKGROUND OF THE INVENTION

From the viewpoint of improving the crashworthiness and the fuel economy of automobiles, steel sheets used for automotive components are required to have higher strength. In particular, a steel sheet used for components around cabins needs to have high YS from the viewpoint of ensuring the safety of passengers. Such components are exposed to a corrosive environment; thus, the steel sheet also needs to have high rusting resistance and delayed fracture resistance in the corrosive environment. Moreover, these components are often subjected to stretch flanging. Thus, the steel sheet needs to have excellent stretch-flangeability also. All these properties are required to be achieved at high levels.

As a coated steel sheet having high strength and high workability, Patent Literature 1 discloses a hot-dip galvanized steel sheet excellent in hydrogen embrittlement resistance (defined the same as delayed fracture resistance), bendability, and having a tensile strength of 770 MPa or more. Patent Literature 1 discloses a hot-dip galvanized steel sheet in which the thickness D of a soft layer in direct contact with the interface with a coated layer and the depth d from the interface between the coating and base iron to an oxide, the oxide being present in a surface layer portion of the steel sheet and containing one or more of Si and Mn, satisfy $d/4 \leq D \leq 2d$.

Patent Literature 2 discloses a high-strength hot-dip galvanized steel sheet excellent in delayed fracture resistance without loss of ductility or strength, in which even if the steel sheet is thin, the delayed fracture resistance is less anisotropic. Patent Literature 2 discloses a high-strength hot-dip galvanized steel sheet, in which in order to prevent delayed fracture that starts from a surface layer portion of a base steel sheet, the surface layer portion of the base steel sheet is a decarbonized layer having only a few hard microstructure components, and fine oxide particles that serve as hydrogen-trapping sites are densely dispersed in the decarbonized layer.

PATENT LITERATURE

PTL 1: International Publication No. 2011/025042
PTL 2: International Publication No. 2013/047760

SUMMARY OF THE INVENTION

However, in Patent Literatures 1 and 2, there is no example in which all of the yield strength (YS), tensile strength (TS), hole expansion formability, and delayed fracture resistance are achieved at high levels. Aspects of the present invention have been made in light of the foregoing problems and aim to provide a high-strength hot-dip galvanized steel sheet having high strength and being excellent in hole expansion formability and delayed fracture resistance and a method for producing the high-strength hot-dip galvanized steel sheet. In accordance with aspects of the present invention, high strength indicates that YS is 1,000 MPa or more and TS is 1,300 MPa or more. Excellent hole expansion formability indicates that the hole expansion ratio is 40% or more at a tensile strength (TS) of 1,300 MPa or more and less than 1,450 MPa, 30% or more at 1,450 MPa or more and less than 1,600 MPa, and 25% or more at 1,600 MPa or more and less than 1,750 MPa. Excellent delayed fracture resistance indicates that no fracture occurs even after immersion in hydrochloric acid with a pH of 3 for 96 hours.

The inventors have conducted intensive studies in order to solve the foregoing problems and have found that all of YS, TS, hole expansion formability, and delayed fracture resistance can be achieved at high levels by adjusting the ratio of the average amount of C at a position 5 μm from a surface layer of a steel sheet in the thickness direction to the average amount of C at a position 70 μm from the surface layer of the steel sheet in the thickness direction to an appropriate range of 0.20 to 0.80 and by the use of a steel microstructure containing, on an area percentage basis, 0% to 15% of ferrite and upper bainite in total, 80% to 100% of lower bainite and martensite in total, and 0% to 10% of retained austenite, and containing precipitates having a particle size of 100 to 2,000 nm in terms of equivalent circular diameter in an amount of $10^9$ to $10^{12}$ particles/m² in a region extending from a surface layer of the steel sheet to a position 100 to 300 μm from the surface layer of the steel sheet in the thickness direction.

Aspects of the present invention are based on the findings described above, and the features thereof are as described below.

[1] A high-strength hot-dip galvanized steel sheet includes a hot-dip galvanized layer on a surface of the steel sheet and has a component composition containing, on a percent by mass basis: C: 0.12% to 0.35%, Si: 0.01% to 3.0%, Mn: 2.0% to 4.0%, P: 0.100% or less (excluding 0), S: 0.02% or less (excluding 0), and Al: 0.01% to 1.50%, the balance being Fe and incidental impurities, and a steel microstructure containing, on an area percentage basis, 0% to 15% of ferrite and upper bainite in total, 80% to 100% of lower bainite and martensite in total, and 0% to 10% of retained austenite, and containing precipitates having a particle size of 100 to 2,000 nm in terms of equivalent circular diameter in an amount of $10^9$ to $10^{12}$ particles/m² in a region extending from a surface layer of the steel sheet to a position 100 to 300 μm from the surface layer of the steel sheet in the thickness direction, in which the ratio of the average amount of C at a position 5 μm from the surface layer of the steel sheet in the thickness direction to the average amount of C at a position 70 μm from the surface layer of the steel sheet in the thickness direction is 0.20 to 0.80.

[2] In the high-strength hot-dip galvanized steel sheet described in [1], in the precipitates having a particle size of 100 to 2,000 nm, the ratio $N_1/N_2$ of the number $N_1$ of precipitates present on grain boundaries of prior austenite to the number $N_2$ of precipitates present at other positions is ⅓ or less.

[3] In the high-strength hot-dip galvanized steel sheet described in [1] or [2], the component composition further contains, on a percent by mass basis, one or more selected from Ti: 0.005% to 0.20%, Nb: 0.005% to 0.20%, V: 0.005% to 2.0%, and Mo: 0.005 to 2.0%.

[4] In the high-strength hot-dip galvanized steel sheet described in any one of [1] to [3], the component composition further contains, on a percent by mass basis, one or more selected from Cr: 0.005% to 2.0%, Ni: 0.005% to 2.0%, Cu: 0.005% to 2.0%, B: 0.0002% to 0.0050%, Ca: 0.001% to 0.005%, a REM: 0.001% to 0.005%, Sn: 0.001% to 0.05%, and Sb: 0.001% to 0.05%.

[5] In the high-strength hot-dip galvanized steel sheet described in any one of [1] to [4], the hot-dip galvanized layer is a hot-dip galvannealed layer.

[6] A method for producing a high-strength hot-dip galvanized steel sheet includes subjecting a slab having the component composition described in any one of [1], [3], and [4] to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ (ratio by vol %) under conditions where the maximum temperature reached is 600° C. to 750° C. and where the maximum temperature reached and the holding time satisfy formula (1) described below, then performing cold rolling at a rolling reduction of 20% or more, subsequently performing annealing that includes heating to a temperature in the temperature range of Ac3 to 950° C., holding for 10 to 600 s at a dew point of −35° C. to +20° C. in this temperature range, then cooling to 550° C. at an average cooling rate of 3° C./s or more, and holding at 400° C. to 550° C. for 5 to 300 s, then performing hot-dip galvanizing treatment and, optionally, alloying treatment, and subsequently performing cooling to room temperature, $$21,000 \geq (273+T) \times [20+\log_{10}(t/3,600)] \quad (1)$$

where in formula (1), T is the maximum temperature reached (° C.), and t is the holding time (s).

[7] In the method for producing a high-strength hot-dip galvanized steel sheet described in [6], in the step of heating to a temperature of Ac3 to 950° C., the heating is performed at an average heating rate of 10° C./s or more from 500° C. to 700° C.

According to aspects of the present invention, the high-strength hot-dip galvanized steel sheet excellent in hole expansion formability and delayed fracture resistance is produced. The high-strength hot-dip galvanized steel sheet having such characteristics can be suitably used as a material for automotive components.

DETAILED DESCRIPTION OF EMBODIMENTS OF THE INVENTION

Figure 1:
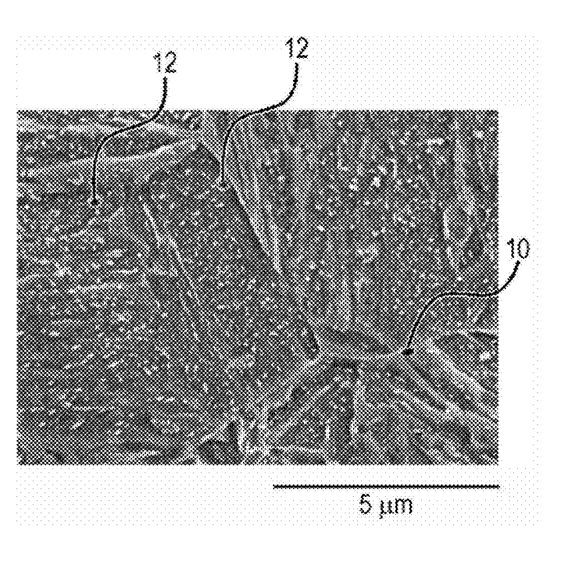
The FIGURE is a SEM image of a section of a steel sheet subjected to etching treatment with nital.

Embodiments of the present invention will be described below. The present invention is not limited to these embodiments. First, the component composition of a high-strength hot-dip galvanized steel sheet (hereinafter, also referred to as a "steel sheet") according to an embodiment will be described. In the description of the component composition, the symbol "%" used as the units of the element content refers to "% by mass".

C: 0.12% to 0.35%

C is an element effective in forming martensite and carbide-containing bainite to increase TS. A C content of less than 0.12% does not result in an effect of increasing TS, an increase in the strength of the steel sheet, or the steel microstructure of the steel sheet according to the embodiment. Accordingly, the C content needs to be 0.12% or more. The C content is preferably 0.13% or more. A C content of more than 0.35% results in harder martensite to deteriorate the delayed fracture resistance. Accordingly, the C content needs to be 0.35% or less. The C content is preferably 0.32% or less, more preferably 0.30% or less.

Si: 0.01% to 3.0%

Si is an element needed to increase TS by solid-solution strengthening and suppression of tempering of martensite and to obtain excellent delayed fracture resistance. To provide these effects, the Si content needs to be 0.01% or more. The Si content is preferably 0.1% or more, more preferably 0.2% or more. A Si content of more than 3.0% results in excessive formation of ferrite, thereby failing to obtain the steel microstructure of the steel sheet according to the embodiment. Accordingly, the Si content needs to be 3.0% or less. The Si content is preferably 2.5% or less, more preferably 2.0% or less.

Mn: 2.0% to 4.0%

Mn is an element effective in forming martensite and carbide-containing bainite to increase TS. To provide these effects, the Mn content needs to be 2.0% or more. The Mn content is preferably 2.1% or more, more preferably 2.2% or more. A Mn content of more than 4.0% results in embrittlement of steel, thereby failing to obtain the delayed fracture resistance of the steel sheet according to the embodiment. Accordingly, the Mn content needs to be 4.0% or less. The Mn content is preferably 3.7% or less, more preferably 3.4% or less.

P: 0.100% or Less (Excluding 0)

P causes embrittlement of grain boundaries, thereby deteriorating the delayed fracture resistance. Thus, the P content is desirably minimized. However, in the steel sheet according to the embodiment, the P content can be tolerated up to 0.100%. The lower limit of the P content need not be specified. To obtain a P content of the steel sheet of less than 0.0005%, a heavy load is applied to refining to deteriorate production efficiency. Thus, the lower limit of the P content is preferably 0.0005%.

S: 0.02% or Less (Excluding 0)

S increases inclusions to deteriorate the delayed fracture resistance. Thus, the S content is desirably minimized. However, in the steel sheet according to the embodiment, the S content can be tolerated up to 0.02%. The lower limit of the S content need not be specified. To obtain a S content of the steel sheet of less than 0.0001%, a heavy load is applied to refining to deteriorate production efficiency. Thus, the lower limit of the S content is preferably 0.0001%.

Al: 0.01% to 1.50%

Al acts as a deoxidizing agent and thus is preferably added in a deoxidization step. To provide the effect, the Al content needs to be 0.01% or more. The Al content is preferably 0.015% or more. An Al content of more than 1.50% results in excessive formation of ferrite, failing to obtain the steel microstructure of the steel sheet according to the embodiment. Accordingly, the Al content needs to be 1.50% or less. The Al content is preferably 1.00% or less, more preferably 0.70% or less.

The steel sheet according to the embodiment may further contain one or more selected from elements described below, as needed.

Ti: 0.005% to 0.20%, Nb: 0.005% to 0.20%, V: 0.005% to 2.0%, and Mo: 0.005% to 2.0%

Ti, Nb, V, and Mo form fine carbides to suppress coarsening of the grains of the microstructure during heat treatment after hot rolling. Thus, the grains after annealing can be refined, thereby further enhancing the hole expansion formability of the steel sheet. These effects are provided by the incorporation of one or more selected from Ti, Nb, V, and Mo in amounts of the above-mentioned lower limits or more. When the amounts of these contained are more than the respective upper limits, the amount of carbon dissolved in steel is decreased to form a large amount of ferrite, thus possibly failing to obtain the steel microstructure of the steel sheet. Accordingly, preferred ranges of one or more selected from Ti, Nb, V, and Mo are preferably as follows: Ti: 0.005% or more and 0.20% or less, Nb: 0.005% or more and 0.20% or less, V: 0.005% or more and 2.0% or less, and Mo: 0.005% or more and 2.0% or less.

Cr: 0.005% to 2.0%, Ni: 0.005% to 2.0%, Cu: 0.005% to 2.0%, B: 0.0002% to 0.0050%, Ca: 0.001% to 0.005%, REM: 0.001% to 0.005%, Sn: 0.001% to 0.05%, and Sb: 0.001% to 0.05%

Cr, Ni, and Cu are elements effective in forming martensite and bainite to increase the strength. To provide these effects, the amount of each of Cr, Ni, and Cu contained is preferably 0.005% or more. When the amount of each of Cr, Ni, and Cu contained is more than 2.0%, a large amount of retained γ is formed, thereby possibly failing to obtain the steel microstructure of the steel sheet. For this reason, the amount of each of Cr, Ni, and Cu is preferably 2.0% or less.

B is an element effective in enhancing the hardenability of the steel sheet and forming martensite and bainite to increase the strength. To provide these effects, the B content is preferably 0.0002% or more. A B content of more than 0.0050% may result in the increase of inclusions to deteriorate the delayed fracture resistance. For this reason, the B content is preferably 0.0050% or less.

Ca and REMs are elements effective in shape control of inclusions to improve the delayed fracture resistance. To provide these effects, the amount of each of Ca and REMs is preferably 0.001% or more. When the amount of each of Ca and REMs is more than 0.005%, the amounts of inclusions may be increased to deteriorate the delayed fracture resistance. For this reason, the amount of each of Ca and REMs is preferably 0.005% or less.

Sn and Sb are elements effective in suppressing, for example, denitrization and deboronization to suppress a decrease in the strength of the steel sheet. To provide these effects, the amount of each of Sn and Sb contained is preferably 0.001% or more. When the amount of each of Sn and Sb contained is more than 0.05%, the distribution of the amount of C near a surface layer of the steel sheet may fail to be obtained. For this reason, the amount of each of Sn and Sb is preferably 0.05% or less.

Accordingly, one or more selected from Cr, Ni, Cu, B, Ca, REMs, Sn, and Sb are contained preferably as follows: Cr: 0.005% to 2.0%, Ni: 0.005% to 2.0%, Cu: 0.005% to 2.0%, B: 0.0002% to 0.0050%, Ca: 0.001% to 0.005%, a REM: 0.001% to 0.005%, Sb: 0.001% to 0.05%, and Sn: 0.001% to 0.05%.

The steel sheet according to the embodiment has the above-mentioned component composition, and the balance other than the component composition contains Fe (iron) and incidental impurities. The balance is preferably Fe and incidental impurities. When the above-mentioned optional components are contained in amounts of less than the respective lower limits, these optional components are regarded as incidental impurities. N may be contained in an amount of 0.01% or less as an incidental impurity. Moreover, Zr, Mg, La, and Ce, which are other elements than those mentioned above, may be contained in a total amount of 0.002% or less.

Ratio of Average Amount of C at Position 5 μm from Surface Layer of Steel Sheet in Thickness Direction to Average Amount of C at Position 70 μm from Surface Layer of Steel Sheet in Thickness Direction: 0.20 to 0.80

In the embodiment, the distribution of the amount of C near a surface layer of the steel sheet is significantly important. In the case where the amount of C at the closer position to the surface layer of the steel sheet is the smaller and where the ratio of the amounts of C in a region from the surface layer to a position 70 μm from the surface layer is within a certain range, the stress near the surface layer is relieved to obtain excellent delayed fracture resistance. Accordingly, the ratio of the average amount of C at a position 5 μm from the surface layer of the steel sheet in the thickness direction to the average amount of C at a position 70 μm from the surface layer of the steel sheet in the thickness direction needs to be 0.20 or more and 0.80 or less. The ratio of the average amount of C at the position 5 μm from the surface layer of the steel sheet in the thickness direction to the average amount of C at the position 70 μm from the surface layer of the steel sheet in the thickness direction is preferably 0.25 or more. The ratio of the average amount of C at the position 5 μm from the surface layer of the steel sheet in the thickness direction to the average amount of C at the position 70 μm from the surface layer of the steel sheet in the thickness direction is preferably 0.70 or less, more preferably 0.60 or less. The average amount of C at the position 5 μm from the surface layer of the steel sheet in the thickness direction and the average amount of C at the position 70 μm from the surface layer of the steel sheet in the thickness direction can be measured by glow discharge optical emission spectrometry (GDS). The surface layer of the steel sheet refers to the interface between the hot-dip galvanized layer and the steel sheet. The ratio of the average amount of C at the position 5 μm from the surface layer of the steel sheet in the thickness direction to the average amount of C at the position 70 μm from the surface layer of the steel sheet in the thickness direction is calculated by dividing the average amount of C at the position 5 μm in the thickness direction by the average amount of C at the position 70 μm from the surface layer of the steel sheet in the thickness direction. That is, the ratio of the average amount of C at the position 5 μm from the surface layer of the steel sheet in the thickness direction to the average amount of C at the position 70 μm from the surface layer of the steel sheet in the thickness direction can be calculated from formula (2) described below.

(Average amount of C at position 5 μm from surface layer of steel sheet in thickness direction)/(average amount of C at position 70 μm from surface layer of steel sheet in thickness direction)    (2)

Next, the steel microstructure of the steel sheet according to the embodiment will be described. The steel microstructure of the steel sheet contains, on an area percentage basis, 0% to 15% of ferrite and upper bainite in total, 80% to 100% of lower bainite and martensite in total, and 0% to 10% of retained austenite, and contains precipitates having a particle size of 100 to 2,000 nm in terms of equivalent circular diameter in an amount of $10^9$ to $10^{12}$ particles/m$^2$ in a region extending from the surface layer of the steel sheet to a position 100 to 300 μm from the surface layer of the steel sheet in the thickness direction.

Total of Ferrite and Upper Bainite: 0% to 15%

Ferrite and upper bainite are desirably minimized because they decrease YS and deteriorate the hole expansion formability. In the steel sheet according to the embodiment, ferrite and upper bainite can be tolerated up to an area percentage of 15%. Accordingly, the total of ferrite and upper bainite needs to be 15% or less. The total of ferrite and upper bainite is preferably 10% or less, more preferably 5% or less. The lower limit of ferrite and upper bainite is 0%.

Total of Lower Bainite and Martensite: 80% to 100%

Lower bainite and martensite are microstructure components needed to achieve both TS and excellent delayed fracture resistance. To provide these effects, the total area percentage of lower bainite and martensite needs to be 80% or more. The total of lower bainite and martensite is preferably 85% or more, more preferably 90% or more. The upper limit of the total of lower bainite and martensite is 100%.

Retained Austenite: 0% to 10%

Retained austenite may be contained in order to improve ductility. However, an area percentage of retained austenite of more than 10% results in a deterioration in delayed fracture resistance. Accordingly, the area percentage of retained austenite needs to be 10% or less. Retained austenite is preferably 8% or less, more preferably 6% or less. The lower limit of the retained austenite is 0%.

Precipitates Having Particle Size of 100 to 2,000 nm in Terms of Equivalent Circular Diameter in Region Extending from Surface Layer of Steel Sheet to Position 100 to 300 μm from Surface Layer of Steel Sheet in Thickness Direction: $10^9$ to $10^{12}$ particles/m$^2$ In the steel sheet according to the embodiment, precipitates are significantly important. In a 100- to 300-μm-depth region, which is close to the surface layer of the steel sheet, precipitates having a particle size of 100 to 2,000 nm in terms of equivalent circular diameter needs to have a number density of $10^9$ particles/m$^2$ or more and $10^{12}$ particles/m$^2$ or less. Thereby, excellent delayed fracture resistance of the steel sheet is obtained. The mechanism thereof is not clear but is presumed to be due to the hydrogen-trapping effect of inclusions. The surface layer of the steel sheet refers to the interface between the hot-dip galvanized layer and the steel sheet.

In the case of precipitates having a particle size of less than 100 nm in terms of equivalent circular diameter or precipitates having a number density of less than $10^9$ particles/m$^2$, this effect is not provided. Precipitates having a particle size of more than 2,000 nm in terms of equivalent circular diameter cause delayed fracture starting from the precipitates. For this reason, the upper limit of the size of the precipitates is set to 2,000 nm in terms of equivalent circular diameter. Accordingly, the precipitates having a particle size of 100 to 2,000 nm in terms of equivalent circular diameter in the region extending from the surface layer of the steel sheet to the position 100 to 300 μm from the surface layer of the steel sheet in the thickness direction need to have a number density of $10^9$ particles/m$^2$ or more. The precipitates preferably have a number density of $5 \times 10^9$ or more. A number density of the precipitates of more than $10^{12}$ particles/m$^2$ results in a deterioration in hole expansion formability. Accordingly, the precipitates having a particle size of 100 to 2,000 nm in terms of equivalent circular diameter in the region extending from the surface layer of the steel sheet to the position 100 to 300 μm from the surface layer of the steel sheet in the thickness direction need to have a number density of $10^{12}$ particles/m$^2$ or less. The precipitates preferably have a number density of $5 \times 10^{11}$ or less. The precipitates are preferably cementite.

In Precipitates Having Particle Size of 100 to 2,000 nm, Ratio $N_1/N_2$ of Number $N_1$ of Precipitates Present on Grain Boundaries of Prior Austenite to Number $N_2$ of Precipitates Present at Other Positions: ⅓ or Less The formation of a larger amount of precipitates having a particle size of 100 nm or more and 2,000 nm or less in terms of equivalent circular diameter in prior austenite grains can further enhance the hole expansion formability of the steel sheet. For this reason, in the precipitates having a particle size of 100 nm or more and 2,000 nm or less, it is preferable that the ratio $N_1/N_2$ of the number $N_1$ of the precipitates on the grain boundaries of prior austenite to the number $N_2$ of the precipitates present at other positions is ⅓ or less. This can further enhance the hole expansion formability of the steel sheet. The ratio $N_1/N_2$ is preferably ¼ or less.

The FIGURE is a SEM image of a section of a steel sheet subjected to etching treatment with nital. In the FIGURE, reference numeral 10 denotes precipitates on the grain boundaries of prior austenite. Reference numeral 12 denotes precipitates inside the grain boundaries of prior austenite. As illustrated in the FIGURE, the precipitates are observed as black spots on the grain boundaries of prior austenite and in the grains of prior austenite.

The area percentages of ferrite, upper bainite, lower bainite, and martensite in the embodiment refer to area fractions of the respective microstructure components with respect to an observation area. These area percentages are determined as follows: A sample is cut from an annealed steel sheet. A section of the sample in the thickness direction and parallel to the rolling direction is polished and then etched with 1% by mass nital. Images are acquired from 3 to 10 fields of view in each of a region in the vicinity of a surface of the steel sheet and a region extending from the surface of the steel sheet to a position 300 to 400 μm from the surface of the steel sheet in the thickness direction with a scanning electron microscope (SEM) at a magnification of 1,500×. The area percentages of the microstructure components are determined from the resulting image data using Image-Pro, available from Media Cybernetics, Inc. The average of the area percentages determined from the fields of view is defined as the area percentage of each of the microstructure components.

In the image data, the microstructure components can be distinguished from one another as described below. Ferrite appears black. Upper bainite appears as a carbide-free dark-gray region. Lower bainite appears as a gray or dark-gray region containing aligned carbide particles in an amount of $10^7$ particles/mm$^2$ or more. Carbides appear as white dots or lines and thus are distinguishable. Martensite appears as a dark-gray, gray, or light-gray region containing carbide particles that are not aligned, or appears as a carbide-free white block, and thus is distinguishable. Retained austenite also appears white, but is distinguishable from martensite by a method described below. Pearlite, which is basically not contained in the steel sheet according to the embodiment, appears as a black and white layered microstructure component and thus is distinguishable.

The volume percentage of retained austenite is determined as follows: An annealed steel sheet is ground to a depth of ¼ of the thickness of the sheet and then further polished to a depth of 0.1 mm by chemical polishing. For the polished surface, the integrated intensities of reflections from the (200), (220), and (311) planes of fcc iron (austenite) and the (200), (211), and (220) planes of bcc iron (ferrite) are measured with an X-ray diffractometer using MoKα radiation. The volume percentage of retained austenite is determined from the intensity ratio of the integrated intensity of reflection from the planes of fcc iron to the integrated intensity of reflection from the planes of bcc iron. The value of the volume percentage of retained austenite is used as a value of the area percentage of retained austenite. Retained austenite and martensite are distinguishable from each other by calculating the area percentage of retained austenite in this manner.

The number of the precipitates having a particle size of 100 to 2,000 nm in terms of equivalent circular diameter is calculated as follows: As with the measurement of the area percentage of the steel microstructure components, a section in a region extending from the surface layer of the steel sheet to a position 100 to 300 μm from the surface layer in the thickness direction is polished and etched with 1% by mass nital. Images are acquired from 3 to 10 fields of view in the resulting surface with a SEM at a magnification of 1,500×. The equivalent circular diameter and the number of precipitates are determined from the resulting image data. Assuming that the average value of the numbers of precipitates in these fields of view is a representative value of the number of precipitates in the steel sheet, the number of precipitates in 1 m² is calculated. The ratio $N_1/N_2$ of the number ($N_1$) of precipitates on the grain boundaries of prior austenite to the number ($N_2$) of precipitates inside the grain boundaries, which are other positions, of prior austenite is also determined as follows: The number ($N_1$) of the precipitates on the grain boundaries of prior austenite and the number ($N_2$) of the precipitates inside the grain boundaries of prior austenite are counted from the SEM image data, and $N_1/N_2$ is calculated from the average values of these fields of view.

The ratio of the average amount of C at a position 5 μm from the surface layer of the steel sheet in the thickness direction with respect to the average amount of C at a position 70 μm from the surface layer of the steel sheet in the thickness direction is measured by GDS. The galvanized layer is removed, for example, by pickling with hydrochloric acid to expose a surface layer of the steel sheet. Subsequently, the surface layer of the steel sheet is subjected to measurement by GDS using Ar as plasma gas at a gas pressure of 600 Pa, a high-frequency output of 35 W, and measurement intervals of 0.1 s. The measurement is performed from the surface to a depth of 80 μm or more. The ratio of the detected intensity of C at a sputtering time corresponding to a depth of 5 μm to the detected intensity of C at a sputtering time corresponding to a depth of 70 μm is determined.

Next, a method for producing a steel sheet according to the embodiment will be described. A steel sheet according to the embodiment is produced by subjecting a slab having the above-mentioned components to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ under conditions where a maximum temperature reached is 600° C. to 750° C. and where the maximum temperature reached T and a holding time t satisfy formula (1) described below, then performing cold rolling at a rolling reduction of 20% or more, subsequently performing annealing that includes heating to a temperature in the range of Ac3 to 950° C., holding for 10 to 600 s at a dew point of −35° C. to +20° C. in this temperature range, then cooling to 550° C. or lower at an average cooling rate of 3° C./s or more, and holding at 400° C. to 550° C. for 5 to 300 s, then performing hot-dip galvanizing treatment and, optionally, alloying treatment, and subsequently performing cooling to room temperature. In the heating step of heating to a temperature in the range of Ac3 to 950° C. in the annealing, the average heating rate during heating from 500° C. to 700° C. is preferably 10° C./s or more. The details of the method for producing a high-strength hot-dip galvanized steel sheet will be described below. Each temperature described in the production conditions is represented by the surface temperature of the steel sheet.

$$21{,}000 \geq (273+T) \times [20 + \log_{10}(t/3{,}600)] \quad (1)$$

where in the FIGURE, T is the maximum temperature reached (° C.), and t is the holding time (s). t refers to the holding time in the temperature range of T to T-20° C.

Coiling Temperature: 590° C. or Lower

A coiling temperature of higher than 590° C. results in excessive internal oxidation to fail to obtain the distribution of the amount of C at the surface layer of the steel sheet after annealing. Accordingly, the coiling temperature is 590° C. or lower. The lower limit thereof need not be specified, but is preferably 400° C. in view of shape stability.

Atmosphere: $O_2 \leq 1\%$ by Volume and $O_2/H_2 \leq 0.2$ (Ratio by Vol %)

In the heat treatment of the hot-rolled steel sheet, the atmosphere contains oxygen at $O_2 \leq 1\%$ by volume and $O_2/H_2 \leq 0.2$ (ratio by vol %). This suppresses internal oxidation to obtain the distribution of the amount of C at the surface layer of the steel sheet after annealing. Accordingly, the atmosphere during the heat treatment of the hot-rolled steel sheet needs to be such that $O_2 \leq 1\%$ by volume and $O_2/H_2 \leq 0.2$. The remainder of the atmosphere, other than $O_2$ or $H_2$, is preferably $N_2$ or argon.

Maximum Temperature Reached: 600° C. to 750° C., and Maximum Temperature Reached T and Holding Time t: Satisfying Formula (1) Below $$21{,}000 \geq (273+T) \times [20 + \log_{10}(t/3{,}600)] \quad (1)$$

In formula (1), T is the maximum temperature reached (° C.), and t is the holding time (s).

In the heat treatment of the hot-rolled steel sheet, a maximum temperature reached of lower than 600° C. leads to insufficient growth of precipitates, such as cementite, thereby failing to obtain precipitates having 100 nm or more and 2,000 nm or less after annealing. Accordingly, the maximum temperature reached needs to be 600° C. or higher. In the case where the maximum temperature reached is higher than 750° C. or where the maximum temperature reached T and the holding time t do not satisfy formula (1), coarse precipitates are formed, thereby failing to obtain precipitates having 100 nm or more and 2,000 nm or less after annealing. Accordingly, it is necessary to set the maximum temperature reached to 750° C. or lower and to set the maximum temperature reached T (° C.) and the holding time t (s) to values that satisfy above-mentioned formula (1).

Cold Rolling Reduction: 20% or More

A cold rolling reduction of less than 20% results in the formation of non-recrystallized ferrite, thereby failing to obtain the steel microstructure of the steel sheet according to the embodiment. Accordingly, the cold rolling reduction needs to be 20% or more. The cold rolling reduction is preferably 30% or more. The upper limit of the cold rolling reduction need not be specified, but is preferably 90% or less in view of shape stability and so forth.

Average Heating Rate from 500° C. to 700° C.: 10° C./s or More

When the temperature is increased at an average heating rate of 10° C./s or more from 500° C. to 700° C. in the annealing, precipitates at the grain boundaries can be reduced to further enhance the hole expansion formability.

Accordingly, the average heating rate from 500° C. to 700° C. is preferably 10° C./s or more. The average heating rate is calculated by dividing 200° C., which is the temperature difference between 500° C. and 700° C., by the time required for heating from 500° C. to 700° C.

Annealing Temperature: Ac3 to 950° C.

An annealing temperature of lower than Ac3 leads to insufficient formation of austenite, thereby failing to obtain the steel microstructure of the steel sheet according to the embodiment. Accordingly, the annealing temperature needs to be Ac3 or higher. An annealing temperature of higher than 950° C. results in dissolution of precipitates, thereby failing to obtain the steel microstructure of the steel sheet according to the embodiment. Accordingly, the annealing temperature needs to be 950° C. or lower.

Annealing Holding Time: 10 to 600 s

An annealing holding time of less than 10 s leads to insufficient formation of austenite, thereby failing to obtain the steel microstructure of the steel sheet according to the embodiment. Accordingly, the annealing holding time needs to be 10 s or more. The annealing holding time is preferably 20 s or more, more preferably 30 s or more. An annealing holding time of more than 600 s results in excessive internal oxidation, thereby failing to obtain the strength of the steel sheet according to the embodiment and the distribution of the amount of C at the surface layer. Accordingly, the annealing holding time needs to be 600 s or less. The annealing holding time is preferably 500 s or less, more preferably 400 s or less.

Dew Point at Annealing Temperature: −35° C. to +20° C.

A dew point during the annealing of lower than −35° C. leads to insufficient oxidation reaction of C at the surface layer of the steel sheet, thereby failing to obtain the distribution of the amount of C at the surface layer of the steel sheet according to the embodiment. Accordingly, the dew point at the annealing temperature needs to be −35° C. or higher. A dew point of higher than +20° C. leads to excessive internal oxidation, thereby failing to obtain the strength of the steel sheet according to the embodiment and the distribution of the amount of C at the surface layer. Accordingly, the dew point at the annealing temperature needs to be +20° C. or lower. The dew point at the annealing temperature is preferably +15° C. or lower, more preferably +10° C. or lower.

Average Cooling Rate from Annealing Temperature to 550° C.: 3° C./s or More

When the average cooling rate from the annealing temperature to 550° C. is less than 3° C./s, ferrite is excessively formed, thereby failing to obtain the steel microstructure of the steel sheet according to the embodiment. Accordingly, the average cooling rate from the annealing temperature to 550° C. needs to be 3° C./s or more. The average cooling rate from the annealing temperature to 550° C. is preferably 5° C./s or more. The upper limit of the average cooling rate from the annealing temperature to 550° C. need not be specified, but is preferably less than 100° C./s in view of shape stability. The average cooling rate is calculated by dividing the temperature difference between the annealing temperature and 550° C. by the time required for cooling from the annealing temperature to 550° C.

Holding Temperature: 400° C. to 550° C.

A holding temperature of lower than 400° C. results in the formation of carbide-containing bainite and tempered martensite to lead to coarsening of carbides during the subsequent coating treatment or alloying treatment for coating, thereby failing to obtain the microstructure of the steel sheet according to the embodiment. Accordingly, the holding temperature needs to be 400° C. or higher. A holding temperature of higher than 550° C. leads to excessive formation of ferrite and pearlite, thereby failing to obtain the steel microstructure of the steel sheet according to the embodiment. Accordingly, the holding temperature needs to be 550° C. or lower.

Holding Time at 400° C. to 550° C.: 5 to 300 s

Holding at 400° C. or higher and 550° C. or lower for 5 s or more causes the bainite transformation near the surface layer of the steel sheet to proceed, thereby obtaining the distribution of the amount of C at the surface layer of the steel sheet according to the embodiment. A holding time of less than 5 s is insufficient to achieve the effect, thereby failing to obtain the distribution of the amount of C at the surface layer of the steel sheet according to the embodiment. Accordingly, the holding time at 400° C. or higher and 550° C. or lower needs to be 5 s or more. The holding time at 400° C. or higher and 550° C. or lower is preferably 10 s or more. When the holding time at 400° C. or higher and 550° C. or lower is more than 300 s, bainite is excessively formed, thereby failing to obtain the steel microstructure of the steel sheet according to the embodiment. Accordingly, the holding time at 400° C. or higher and 550° C. or lower needs to be 300 s or less. The holding time at 400° C. or higher and 550° C. or lower is preferably 200 s or less, more preferably 120 s or less. During the holding, the temperature need not be constant as long as it is in the range of 400° C. to 550° C., and cooling or heating may be performed.

Other production conditions are not particularly limited. For example, the following conditions may be used. The slab is preferably produced by a continuous casting process in order to prevent macrosegregation. However, the slab may be produced by an ingot-making process or a thin slab casting process. To hot-rolling the slab, the slab may be temporarily cooled to room temperature and reheated before hot rolling. The slab may be transferred into a heating furnace without cooling to room temperature, and then hot-rolled. An energy-saving process may be employed in which the slab is slightly held at a temperature for a short time and then immediately hot-rolled. In the case of heating the slab, heating is preferably performed in such a manner that the slab temperature is 1,100° C. or higher and 1,300° C. or lower. Heating the slab to temperature of 1,100° C. or higher can dissolve carbides to suppress an increase in rolling load. A slab temperature of 1,300° C. or lower results in suppression of an increase in the amount of scale loss. The slab temperature is represented by the temperature of the slab surface.

In the process of hot-rolling the slab, a rough-rolled bar obtained by rough rolling may be heated. A continuous rolling process may be employed in which rough-rolled bars are joined to one another and continuously subjected to finish hot rolling. In the hot rolling, for the purposes of reducing the rolling load and providing a uniform shape and a uniform quality, it is preferable to perform lubrication rolling, in which the coefficient of friction is 0.10 to 0.25, in some or all passes of the finish hot rolling.

The steel sheet that has been coiled is subjected to pickling or the like to remove scales. Then the steel sheet is subjected to cold rolling, annealing, and hot-dip galvanization. After the galvanization, the steel sheet is cooled to room temperature and then preferably subjected to temper rolling at an elongation of 1% or less in order to control the surface quality and the yield strength (YS). To adjust the shape and YS, leveling may be performed.

Examples

Aspects of the present invention will be specifically described below by examples. Molten steels (the balance being Fe and incidental impurities) were produced in a vacuum melting furnace in the laboratory and then hot-rolled into steel slabs. Table 1 presents the component compositions of the steels.

TABLE 1

| Steel | Component composition (% by mass) | | | | | | | Ac3 transformation point (° C.) | Remarks |
|---|---|---|---|---|---|---|---|---|---|
| | C | Si | Mn | P | S | Al | Others | | |
| A | 0.16 | 0.3 | 3.3 | 0.010 | 0.0023 | 0.03 | — | 739 | within scope of invention |
| B | 0.19 | 0.8 | 3.0 | 0.005 | 0.0010 | 0.03 | V: 0.10, Cr: 0.25 | 774 | within scope of invention |
| C | 0.22 | 1.4 | 2.5 | 0.015 | 0.0005 | 0.03 | Mo: 0.15, Ni: 0.40 | 803 | within scope of invention |
| D | 0.26 | 0.5 | 3.7 | 0.010 | 0.0015 | 0.20 | Ti: 0.025, B: 0.0015 | 758 | within scope of invention |
| E | 0.13 | 1.6 | 3.5 | 0.025 | 0.0002 | 0.03 | Nb: 0.025, Cu: 0.15 | 799 | within scope of invention |
| F | 0.16 | 0.1 | 3.5 | 0.002 | 0.0015 | 0.01 | Ti: 0.015, Nb: 0.015, Ca: 0.001 | 726 | within scope of invention |
| G | 0.20 | 1.0 | 2.9 | 0.010 | 0.0015 | 0.07 | Mo: 0.05, Nb: 0.020, REM: 0.002 | 782 | within scope of invention |
| H | 0.15 | 0.5 | 3.3 | 0.010 | 0.0015 | 0.03 | Sb: 0.01 | 762 | within scope of invention |
| I | 0.15 | 0.5 | 3.3 | 0.010 | 0.0015 | 0.03 | Sn: 0.03 | 754 | within scope of invention |
| J | 0.11 | 0.3 | 3.0 | 0.010 | 0.0022 | 0.03 | Ti: 0.020 | 770 | outside scope of invention |
| K | 0.36 | 0.3 | 3.0 | 0.010 | 0.0010 | 0.03 | Nb: 0.010 | 708 | outside scope of invention |
| L | 0.16 | 3.2 | 3.0 | 0.010 | 0.0015 | 0.03 | — | 878 | outside scope of invention |
| M | 0.16 | 0.3 | 1.8 | 0.010 | 0.0005 | 0.03 | — | 784 | outside scope of invention |
| N | 0.16 | 0.3 | 4.4 | 0.010 | 0.0005 | 0.03 | — | 706 | outside scope of invention |

These steel slabs were heated to 1,250° C. and then subjected to rough rolling and hot rolling. The resulting hot-rolled steel sheets were subjected to heat treatment. Subsequently, the steel sheets were cold-rolled to a thickness of 1.4 mm to form cold-rolled steel sheets. The resulting cold-rolled steel sheets were subjected to annealing. Hot-dip galvanized steel sheets (GI) and hot-dip galvannealed steel sheets (GA) 1 and 2 were produced through the annealing by heat-treating and by using coating apparatus in the laboratory. Each of the hot-dip galvanized steel sheets was produced by immersion in a coating bath with a temperature of 465° C. to form a coated layer on each surface of the steel sheet at a coating weight of 40 to 60 g/m² per side. Each of the hot-dip galvannealed steel sheets was produced by, after the above-mentioned coating, performing alloying treatment including holding at 540° C. for 1 to 60 s. After the coating treatment, the steel sheets were cooled to room temperature at 8° C./s and then subjected to temper rolling at an elongation of 0.1%. Table 2 presents the production conditions of the hot-dip galvanized steel sheets and the hot-dip galvannealed steel sheets.

TABLE 2

| Steel sheet No. | Steel | Hot rolling condition Coiling temperature (° C.) | Heat treatment conditions for hot-rolled steel sheet | | | | | Cold rolling condition Cold rolling reduction (%) | Annealing conditions Rate of temperature increase from 500° C. to 700° C. (° C./s) |
|---|---|---|---|---|---|---|---|---|---|
| | | | Maximum temperature reached (° C.) | Holding time (s) | P value *1 | O₂ (%) | O₂/H₂ | | |
| 1 | A | 500 | 660 | 18000 | 19312 | 0.1 | 0.02 | 50 | 15 |
| 2 | | 620 | 660 | 18000 | 19312 | 0.1 | 0.02 | 50 | 15 |
| 3 | | 500 | 660 | 18000 | 19312 | 2.0 | 0.40 | 50 | 15 |
| 4 | B | 500 | 660 | 18000 | 19312 | 0.1 | 0.02 | 50 | 15 |
| 5 | | 500 | 580 | 18000 | 17656 | 0.1 | 0.02 | 50 | 15 |
| 6 | | 500 | 765 | 5000 | 20908 | 0.1 | 0.02 | 50 | 15 |
| 7 | C | 450 | 720 | 18000 | 20554 | 0.1 | 0.02 | 30 | 15 |
| 8 | | 450 | 720 | 180000 | 21547 | 0.1 | 0.02 | 30 | 15 |
| 9 | | 450 | 720 | 18000 | 20554 | 0.1 | 0.02 | 30 | 15 |
| 10 | D | 500 | 660 | 18000 | 19312 | 0.1 | 0.02 | 50 | 15 |
| 11 | | 500 | 660 | 18000 | 19312 | 0.1 | 0.25 | 50 | 15 |
| 12 | | 500 | 660 | 18000 | 19312 | 0.1 | 0.02 | 50 | 15 |
| 13 | E | 400 | 600 | 18000 | 18070 | 0.1 | 0.02 | 60 | 15 |
| 14 | | 400 | 600 | 18000 | 18070 | 0.1 | 0.02 | 60 | 15 |
| 15 | | 400 | 600 | 18000 | 18070 | 0.1 | 0.02 | 60 | 15 |
| 16 | F | 550 | 660 | 180000 | 20245 | 0.1 | 0.02 | 70 | 15 |
| 17 | | 550 | 660 | 180000 | 20245 | 0.1 | 0.02 | 15 | 15 |

TABLE 2-continued

| | | | | | | | | |
|---|---|---|---|---|---|---|---|---|
| 18 | | 550 | 660 | 180000 | 20245 | 0.1 | 0.02 | 70 | 15 |
| 19 | G | 500 | 700 | 180 | 18194 | 0.1 | 0.02 | 50 | 15 |
| 20 | | 500 | 700 | 180 | 18194 | 0.1 | 0.02 | 50 | 15 |
| 21 | | 500 | 700 | 180 | 18194 | 0.1 | 0.02 | 50 | 15 |
| 22 | H | 500 | 660 | 18000 | 19312 | 0.1 | 0.02 | 50 | 12 |
| 23 | | 500 | 660 | 18000 | 19312 | 0.1 | 0.02 | 50 | 5 |
| 24 | | 500 | 660 | 18000 | 19312 | 0.1 | 0.02 | 50 | 5 |
| 25 | | 500 | 660 | 18000 | 19312 | 0.1 | 0.02 | 50 | 5 |
| 26 | I | 500 | 660 | 18000 | 19312 | 0.1 | 0.02 | 50 | 30 |
| 27 | | 500 | 660 | 18000 | 19312 | 0.1 | 0.02 | 50 | 30 |
| 28 | | 500 | 660 | 18000 | 19312 | 0.1 | 0.02 | 50 | 30 |
| 29 | J | 500 | 660 | 18000 | 19312 | 0.1 | 0.02 | 50 | 15 |
| 30 | K | 500 | 660 | 18000 | 19312 | 0.1 | 0.02 | 50 | 15 |
| 31 | L | 500 | 660 | 18000 | 19312 | 0.1 | 0.02 | 50 | 15 |
| 32 | M | 500 | 660 | 18000 | 19312 | 0.1 | 0.02 | 50 | 15 |
| 33 | N | 500 | 660 | 18000 | 19312 | 0.1 | 0.02 | 50 | 15 |

| Steel sheet No. | Steel | Annealing conditions | | | | | | | |
|---|---|---|---|---|---|---|---|---|---|
| | | Annealing temperature (° C.) | Annealing time (s) | Dew point (° C.) | Cooling rate *2 (° C./s) | Cooling stop temperature (° C.) | Holding temperature (° C.) | Holding time (s) | Galvannealing | Remarks |
| 1 | A | 870 | 120 | −15 | 5 | 500 | 500 | 50 | Yes | Example |
| 2 | | 870 | 120 | −15 | 5 | 500 | 500 | 50 | Yes | Comparative example |
| 3 | | 870 | 120 | −15 | 5 | 500 | 500 | 50 | Yes | Comparative example |
| 4 | B | 900 | 120 | −5 | 10 | 500 | 500 | 50 | No | Example |
| 5 | | 900 | 120 | −5 | 10 | 500 | 500 | 50 | No | Comparative example |
| 6 | | 900 | 120 | −5 | 10 | 500 | 500 | 50 | No | Comparative example |
| 7 | C | 920 | 120 | 0 | 30 | 550 | 550 | 10 | Yes | Example |
| 8 | | 920 | 120 | 0 | 30 | 550 | 550 | 10 | Yes | Comparative example |
| 9 | | 920 | 120 | 0 | 1 | 550 | 550 | 10 | Yes | Comparative example |
| 10 | D | 800 | 120 | −20 | 10 | 400 | 400 | 200 | Yes | Example |
| 11 | | 800 | 120 | −20 | 10 | 400 | 400 | 200 | Yes | Comparative example |
| 12 | | 750 | 120 | −20 | 10 | 400 | 400 | 200 | Yes | Comparative example |
| 13 | E | 880 | 120 | 10 | 10 | 450 | 450 | 80 | No | Example |
| 14 | | 970 | 120 | 10 | 10 | 450 | 450 | 80 | No | Comparative example |
| 15 | | 880 | 5 | 10 | 10 | 450 | 450 | 80 | No | Comparative example |
| 16 | F | 780 | 120 | −30 | 10 | 480 | 480 | 50 | No | Example |
| 17 | | 780 | 120 | −30 | 10 | 480 | 480 | 50 | No | Comparative example |
| 18 | | 780 | 120 | −30 | 10 | 350 | 480 | 50 | No | Comparative example |
| 19 | G | 940 | 120 | 10 | 10 | 500 | 500 | 30 | Yes | Example |
| 20 | | 940 | 120 | 30 | 10 | 500 | 500 | 30 | Yes | Comparative example |
| 21 | | 940 | 120 | −40 | 10 | 500 | 500 | 30 | Yes | Comparative example |
| 22 | H | 850 | 120 | −15 | 10 | 500 | 500 | 50 | Yes | Example |
| 23 | | 850 | 120 | −15 | 10 | 500 | 500 | 50 | Yes | Example |
| 24 | | 850 | 800 | −15 | 10 | 500 | 500 | 50 | Yes | Comparative example |
| 25 | | 850 | 120 | −15 | 10 | 600 | 600 | 50 | Yes | Comparative example |
| 26 | I | 850 | 120 | −15 | 5 | 500 | 500 | 50 | Yes | Example |
| 27 | | 850 | 120 | −15 | 5 | 500 | 500 | 3 | Yes | Comparative example |
| 28 | | 850 | 120 | −15 | 5 | 500 | 500 | 500 | Yes | Comparative example |
| 29 | J | 850 | 120 | −15 | 5 | 500 | 500 | 50 | No | Comparative example |
| 30 | K | 850 | 120 | −15 | 5 | 500 | 500 | 50 | Yes | Comparative example |
| 31 | L | 850 | 120 | −15 | 5 | 500 | 500 | 50 | Yes | Comparative example |

TABLE 2-continued

| 32 | M | 850 | 120 | −15 | 5 | 500 | 500 | 50 | No | Comparative example |
| 33 | N | 850 | 120 | −15 | 5 | 500 | 500 | 50 | Yes | Comparative example |

*1 P = ( 273 + T) × log 10(t/3600), where T is a maximum temperature reached (° C.), and t is a holding time (s).
*2 Average cooling rate from an annealing temperature to 550° C.

The tensile properties, the hole expansion formability, and the delayed fracture resistance of the resulting hot-dip galvanized steel sheets and the hot-dip galvannealed steel sheets were evaluated according to the following testing methods.

<Tensile Test>

Japan Industrial Standard (JIS) No. 5 tensile test pieces (JIS Z2201:1998) were taken from the annealed steel sheets in a direction perpendicular to the rolling direction. A tensile test was performed according to Japan Industrial Standard (JIS) Z 2241:2011 at a strain rate of $10^{-3}$/s, thereby determining YS and TS. YS was evaluated at 0.2% proof stress. In the Examples, a yield strength (YS) of 1,000 MPa or more was evaluated as acceptable, and a tensile strength (TS) of 1,300 MPa or more was evaluated as acceptable.

<Hole Expanding Test>

A hole expanding test was performed according to The Japan Iron and Steel Federation Standard (JFST) 1001, and λ was measured. Specifically, a hole having a diameter of 10 mm was formed by punching in each coated steel sheet. A cone punch with a 60° apex was forced into the hole while the surrounding portion was fixed. The hole diameter at the crack initiation limit was measured. The maximum hole-expansion ratio λ (%) was determined from formula (3) below.

$$\text{Maximum hole-expansion ratio } \lambda(\%) = \{(D_f - D_0)/D_0\} \times 100 \quad (3)$$

In formula (3), $D_f$ is the hole diameter (mm) at the crack initiation limit, and $D_0$ is the initial hole diameter (mm). In the case where the hole expansion ratio in this hole expanding test was 40% or more at a tensile strength (TS) of 1,300 MPa or more and less than 1,450 MPa, 30% or more at 1,450 MPa or more and less than 1,600 MPa, and 25% or more at 1,600 MPa or more and less than 1,750 MPa, the steel sheet was evaluated as excellent in terms of hole expansion formability.

<Delayed Fracture Resistance>

A test piece having a width of 30 mm and a length of 110 mm was taken from each of the steel sheets, the width direction being parallel to the rolling direction. The test piece was subjected to 90° V-bending at a bending radius of 7 mm in such a manner that the ridge line was parallel to the rolling direction. The test piece was tightened with a bolt by the amount of springback and immersed in a hydrochloric acid with a pH of 3. After holding for 96 hours, the test piece was examined for cracks. In the Examples, when no cracking occurred, the test piece was rated as excellent in terms of delayed fracture resistance, and "excellent" was described in the column "Delayed fracture resistance" in Table 3. When cracking occurred, the test piece was rated as poor in terms of delayed fracture resistance, and "poor" was described in the column "Delayed fracture resistance" in Table 3.

The steel microstructures of the steel sheets, the number of precipitates having a particle size of 100 to 2,000 nm in terms of equivalent circular diameter in a region extending from each surface layer to a position 100 to 300 μm from the surface layer, the ratio of the average amount of C at a position 5 μm from the surface layer of each steel sheet in the thickness direction to the average amount of C at a position 70 μm from the surface layer of the steel sheet in the thickness direction, and regarding the precipitates having a particle size of 100 to 2,000 nm, the ratio $N_1/N_2$ of the number $N_1$ of precipitates present on grain boundaries of prior austenite to the number $N_2$ of precipitates present at other positions were measured by the above-described methods. Table 3 presents these evaluation results, the steel microstructure of the steel sheet, and so forth.

TABLE 3

| Steel sheet No. | Steel microstructure *1 | | | | Precipitates ρ(i) *2 | | C ratio at surface layer *3 | | Tensile property value | | Hole expansion formability | Delayed fracture resistance | Remarks |
| --- | --- | --- | --- | --- | --- | --- | --- | --- | --- | --- | --- | --- | --- |
| | V(F + UB) (%) | V(M + LB) (%) | V(RA) (%) | V(O) (%) | (particles/m²) | $N_1/N_2$ | C(5)/C(70) | | YS (MPa) | TS (MPa) | λ (%) | | |
| 1 | 1 | 97 | 2 | 0 | $3.9 \times 10^{10}$ | 0.12 | 0.60 | | 1035 | 1422 | 52 | excellent | Example |
| 2 | 3 | 95 | 2 | 0 | $4.5 \times 10^{10}$ | 0.15 | 0.83 | | 1004 | 1401 | 51 | poor | Comparative example |
| 3 | 3 | 95 | 2 | 0 | $4.2 \times 10^{10}$ | 0.16 | 0.85 | | 998 | 1397 | 54 | poor | Comparative example |
| 4 | 0 | 97 | 3 | 0 | $1.7 \times 10^{11}$ | 0.20 | 0.50 | | 1030 | 1518 | 43 | excellent | Example |
| 5 | 0 | 96 | 4 | 0 | $5.7 \times 10^{8}$ | 0.18 | 0.48 | | 1044 | 1520 | 44 | poor | Comparative example |
| 6 | 0 | 97 | 3 | 0 | $8.6 \times 10^{8}$ | 0.19 | 0.51 | | 1006 | 1506 | 40 | poor | Comparative example |
| 7 | 0 | 96 | 4 | 0 | $3.1 \times 10^{11}$ | 0.18 | 0.39 | | 1081 | 1626 | 31 | excellent | Example |
| 8 | 0 | 96 | 4 | 0 | $9.2 \times 10^{8}$ | 0.18 | 0.42 | | 1083 | 1621 | 30 | poor | Comparative example |
| 9 | 35 | 59 | 6 | 0 | $2.6 \times 10^{11}$ | 0.19 | 0.40 | | 907 | 1533 | 12 | poor | Comparative example |
| 10 | 0 | 94 | 6 | 0 | $6.5 \times 10^{11}$ | 0.28 | 0.53 | | 1155 | 1745 | 26 | excellent | Example |
| 11 | 0 | 94 | 6 | 0 | $6.1 \times 10^{11}$ | 0.26 | 0.88 | | 1139 | 1734 | 25 | poor | Comparative example |
| 12 | 19 | 74 | 7 | 0 | $9.5 \times 10^{11}$ | 0.27 | 0.67 | | 958 | 1769 | 3 | poor | Comparative example |
| 13 | 3 | 94 | 3 | 0 | $1.8 \times 10^{9}$ | 0.08 | 0.35 | | 1046 | 1483 | 45 | excellent | Example |
| 14 | 2 | 95 | 3 | 0 | $6.8 \times 10^{8}$ | 0.09 | 0.36 | | 1023 | 1438 | 40 | poor | Comparative example |
| 15 | 16 | 80 | 4 | 0 | $4.1 \times 10^{9}$ | 0.10 | 0.37 | | 925 | 1530 | 15 | excellent | Comparative example |
| 16 | 6 | 92 | 2 | 0 | $6.4 \times 10^{9}$ | 0.14 | 0.61 | | 1012 | 1423 | 55 | excellent | Example |

TABLE 3-continued

| Steel sheet No. | Steel microstructure *1 | | | | Precipitates ρ(i) *2 (particles/m²) | N₁/N₂ | C ratio at surface layer *3 C(5)/C(70) | Tensile property value | | Hole expansion form-ability λ (%) | Delayed fracture resistance | Remarks |
|---|---|---|---|---|---|---|---|---|---|---|---|---|
| | V(F + UB) (%) | V(M + LB) (%) | V(RA) (%) | V(O) (%) | | | | YS (MPa) | TS (MPa) | | | |
| 17 | 17 | 80 | 3 | 0 | $6.2 \times 10^9$ | 0.13 | 0.60 | 976 | 1464 | 24 | excellent | Comparative example |
| 18 | 5 | 92 | 2 | 1 | $8.9 \times 10^8$ | 0.12 | 0.63 | 1010 | 1311 | 40 | poor | Comparative example |
| 19 | 8 | 87 | 5 | 0 | $1.3 \times 10^9$ | 0.18 | 0.29 | 1108 | 1599 | 39 | excellent | Example |
| 20 | 7 | 89 | 4 | 0 | $1.4 \times 10^9$ | 0.20 | 0.15 | 1085 | 1582 | 43 | poor | Comparative example |
| 21 | 5 | 92 | 3 | 0 | $1.6 \times 10^9$ | 0.20 | 0.86 | 1124 | 1617 | 32 | poor | Comparative example |
| 22 | 0 | 97 | 3 | 0 | $2.0 \times 10^{10}$ | 0.16 | 0.54 | 1033 | 1395 | 55 | excellent | Example |
| 23 | 0 | 97 | 3 | 0 | $2.5 \times 10^{10}$ | 0.41 | 0.56 | 1007 | 1389 | 45 | excellent | Example |
| 24 | 0 | 97 | 3 | 0 | $1.5 \times 10^{10}$ | 0.15 | 0.18 | 994 | 1372 | 43 | poor | Comparative example |
| 25 | 16 | 81 | 3 | 0 | $1.8 \times 10^{10}$ | 0.16 | 0.60 | 914 | 1386 | 19 | excellent | Comparative example |
| 26 | 2 | 95 | 3 | 0 | $9.7 \times 10^9$ | 0.14 | 0.48 | 1016 | 1440 | 49 | excellent | Example |
| 27 | 2 | 95 | 3 | 0 | $9.6 \times 10^9$ | 0.15 | 0.82 | 1035 | 1448 | 47 | poor | Comparative example |
| 28 | 29 | 66 | 5 | 0 | $9.3 \times 10^9$ | 0.16 | 0.36 | 941 | 1403 | 28 | poor | Comparative example |
| 29 | 2 | 97 | 1 | 0 | $2.3 \times 10^{10}$ | 0.10 | 0.57 | 963 | 1286 | 65 | excellent | Comparative example |
| 30 | 0 | 89 | 11 | 0 | $2.2 \times 10^{12}$ | 0.35 | 0.28 | 1218 | 2017 | 17 | poor | Comparative example |
| 31 | 37 | 56 | 7 | 0 | $5.4 \times 10^9$ | 0.17 | 0.64 | 892 | 1538 | 10 | poor | Comparative example |
| 32 | 58 | 38 | 4 | 0 | $4.0 \times 10^{10}$ | 0.15 | 0.73 | 729 | 1055 | 31 | excellent | Comparative example |
| 33 | 0 | 88 | 12 | 0 | $5.0 \times 10^{10}$ | 0.16 | 0.44 | 1000 | 1551 | 25 | poor | Comparative example |

*1 V(F + UB): The total area percentage of ferrite and upper bainite, V(M + LB): the total area percentage of martensite and lower bainite, V(RA): the area percentage of retained austenite, and V(O): total area percentage of microstructures other than those mentioned above.
*2 ρ(i): The number density of precipitates having an equivalent circular diameter of 100 to 2,000 nm in a region extending from a surface layer to a position 100 to 300 μm from the surface layer.
*3 C Ratio at surface layer: The ratio of the average amount of C at a position 5 μm from a surface layer to the average amount of C at a position 70 μm from the surface layer.

Table 3 reveals that in the examples, the high-strength galvanized steel sheets and the hot-dip galvannealed steel sheets each having a yield strength (YS) of 1,000 MPa or more and a tensile strength (TS) of 1,300 MPa or more and being excellent in hole expansion formability and delayed fracture resistance are produced. In contrast, in the comparative examples outside the scope of the present invention, one or more of excellent YS, TS, hole expansion formability, and delayed fracture resistance were not obtained.

REFERENCE SIGNS LIST 10 precipitate on grain boundary of prior austenite
12 precipitate inside grain boundary of prior austenite

The invention claimed is:

1. A high-strength hot-dip galvanized steel sheet, comprising:
a hot-dip galvanized layer on a surface of the steel sheet;
a component composition containing, on a percent by mass basis:
C: 0.12% to 0.35%,
Si: 0.01% to 3.0%,
Mn: 2.0% to 4.0%,
P: 0.100% or less (excluding 0),
S: 0.02% or less (excluding 0), and
Al: 0.01% to 1.50%, the balance being Fe and incidental impurities; and
a steel microstructure containing, on an area percentage basis, 0% to 15% of ferrite and upper bainite in total, 80% to 100% of lower bainite and martensite in total, and 0% to 10% of retained austenite, and containing precipitates having a particle size of 100 to 2,000 nm in terms of equivalent circular diameter in an amount of $10^9$ to $10^{12}$ particles/m² in a region extending from a surface layer of the steel sheet to a position 100 to 300 μm from the surface layer of the steel sheet in a thickness direction,
wherein a ratio of an average amount of C at a position 5 μm from the surface layer of the steel sheet in the thickness direction to an average amount of C at a position 70 μm from the surface layer of the steel sheet in the thickness direction is 0.20 to 0.80.

2. The high-strength hot-dip galvanized steel sheet according to claim 1, wherein in the precipitates having a particle size of 100 to 2,000 nm, a ratio $N_1/N_2$ of a number $N_1$ of precipitates present on grain boundaries of prior austenite to a number $N_2$ of precipitates present at other positions is ⅓ or less.

3. The high-strength hot-dip galvanized steel sheet according to claim 1, wherein the component composition further contains, on a percent by mass basis, one or more selected from the following groups A and B:
Group A:
one or more selected from:
Ti: 0.005% to 0.20%,
Nb: 0.005% to 0.20%,
V: 0.005% to 2.0%, and
Mo: 0.005 to 2.0%.
Group B:
one or more selected from:
Cr: 0.005% to 2.0%,
Ni: 0.005% to 2.0%,
Cu: 0.005% to 2.0%,
B: 0.0002% to 0.0050%,
Ca: 0.001% to 0.005%,
a REM: 0.001% to 0.005%,
Sn: 0.001% to 0.05%, and
Sb: 0.001% to 0.05%.

4. The high-strength hot-dip galvanized steel sheet according to claim 2, wherein the component composition further contains, on a percent by mass basis, one or more selected from the following groups A and B:

Group A:
one or more selected from:
  Ti: 0.005% to 0.20%,
  Nb: 0.005% to 0.20%,
  V: 0.005% to 2.0%, and
  Mo: 0.005 to 2.0%.
Group B:
one or more selected from:
  Cr: 0.005% to 2.0%,
  Ni: 0.005% to 2.0%,
  Cu: 0.005% to 2.0%,
  B: 0.0002% to 0.0050%,
  Ca: 0.001% to 0.005%,
  a REM: 0.001% to 0.005%,
  Sn: 0.001% to 0.05%, and
  Sb: 0.001% to 0.05%.

5. The high-strength hot-dip galvanized steel sheet according to claim 1, wherein the hot-dip galvanized layer is a hot-dip galvannealed layer.

6. The high-strength hot-dip galvanized steel sheet according to claim 2, wherein the hot-dip galvanized layer is a hot-dip galvannealed layer.

7. The high-strength hot-dip galvanized steel sheet according to claim 3, wherein the hot-dip galvanized layer is a hot-dip galvannealed layer.

8. The high-strength hot-dip galvanized steel sheet according to claim 4, wherein the hot-dip galvanized layer is a hot-dip galvannealed layer.

9. A method for producing a high-strength hot-dip galvanized steel sheet, comprising subjecting a slab having the component composition according to claim 1 to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ (ratio by vol %) under conditions where a maximum temperature reached is 600° C. to 750° C. and where the maximum temperature reached and a holding time satisfy formula (1) described below, then performing cold rolling at a rolling reduction of 20% or more, subsequently performing annealing that includes heating to a temperature in a temperature range of Ac3 to 950° C., holding for 10 to 600 s at a dew point of −35° C. to +20° C. in this temperature range, then cooling to 550° C. at an average cooling rate of 3° C/s or more, and holding at 400° C. to 550° C. for 5 to 300 s, then performing hot-dip galvanizing treatment and, optionally alloying treatment, and subsequently performing cooling to room temperature, $$21{,}000 \geq (273+T) \times [20 + \log_{10}(t/3{,}600)] \quad (1)$$

where in formula (1), T is the maximum temperature reached (° C.), and t is the holding time (s).

10. A method for producing a high-strength hot-dip galvanized steel sheet, comprising subjecting a slab having the component composition according to claim 3 to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ (ratio by vol %) under conditions where a maximum temperature reached is 600° C. to 750° C. and where the maximum temperature reached and a holding time satisfy formula (1) described below, then performing cold rolling at a rolling reduction of 20% or more, subsequently performing annealing that includes heating to a temperature in a temperature range of Ac3 to 950° C., holding for 10 to 600 s at a dew point of −35° C. to +20° C. in this temperature range, then cooling to 550° C. at an average cooling rate of 3° C/s or more, and holding at 400° C. to 550° C. for 5 to 300 s, then performing hot-dip galvanizing treatment and, optionally alloying treatment, and subsequently performing cooling to room temperature, $$21{,}000 \geq (273+T) \times [20 + \log_{10}(t/3{,}600)] \quad (1)$$

where in formula (1), T is the maximum temperature reached (° C.), and t is the holding time (s).

11. A method for producing a high-strength hot-dip galvanized steel sheet, comprising subjecting a slab having the component composition according to claim 4 to hot rolling, then cooling, and coiling at a temperature of 590° C. or lower to produce a hot-rolled steel sheet, subjecting the hot-rolled steel sheet to pickling, then performing heat treatment in an atmosphere in which $O_2 \leq 1\%$ by volume and $O_2/H_2 \leq 0.2$ (ratio by vol %) under conditions where a maximum temperature reached is 600° C. to 750° C. and where the maximum temperature reached and a holding time satisfy formula (1) described below, then performing cold rolling at a rolling reduction of 20% or more, subsequently performing annealing that includes heating to a temperature in a temperature range of Ac3 to 950° C., holding for 10 to 600 s at a dew point of −35° C. to +20° C. in this temperature range, then cooling to 550° C. at an average cooling rate of 3° C/s or more, and holding at 400° C. to 550° C. for 5 to 300 s, then performing hot-dip galvanizing treatment and, optionally alloying treatment, and subsequently performing cooling to room temperature, $$21{,}000 \geq (273+T) \times [20 + \log_{10}(t/3{,}600)] \quad (1)$$

where in formula (1), T is the maximum temperature reached (° C.), and t is the holding time (s).

12. The method for producing a high-strength hot-dip galvanized steel sheet according to claim 9, wherein in the step of heating to a temperature of Ac3 to 950° C., the heating is performed at an average heating rate of 10° C/s or more from 500° C. to 700° C.

13. The method for producing a high-strength hot-dip galvanized steel sheet according to claim 10, wherein in the step of heating to a temperature of Ac3 to 950° C., the heating is performed at an average heating rate of 10° C/s or more from 500° C. to 700° C.

14. The method for producing a high-strength hot-dip galvanized steel sheet according to claim 11, wherein in the step of heating to a temperature of Ac3 to 950° C., the heating is performed at an average heating rate of 10° C/s or more from 500° C. to 700° C.

\* \* \* \* \*